United States Patent
Accisano et al.

(10) Patent No.: US 11,544,438 B2
(45) Date of Patent: Jan. 3, 2023

(54) SUPERCONDUCTIVE CIRCUIT SPLITTER PLACEMENT

(71) Applicant: Microsoft Technology Licensing, LLC, Redmond, WA (US)

(72) Inventors: Paul Accisano, Seattle, WA (US); Kenneth Reneris, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/241,362

(22) Filed: Apr. 27, 2021

(65) Prior Publication Data
US 2022/0343049 A1 Oct. 27, 2022

(51) Int. Cl.
*G06F 30/392* (2020.01)
*H01L 39/02* (2006.01)
*G06F 111/04* (2020.01)

(52) U.S. Cl.
CPC .......... *G06F 30/392* (2020.01); *H01L 39/025* (2013.01); *G06F 2111/04* (2020.01)

(58) Field of Classification Search
USPC ........................................................ 716/122
See application file for complete search history.

(56) References Cited

U.S. PATENT DOCUMENTS

| | | | | |
|---|---|---|---|---|
| 2005/0224784 A1* | 10/2005 | Amin | ................... | B82Y 10/00 257/14 |
| 2017/0228483 A1* | 8/2017 | Rigetti | ................... | G06F 30/367 |
| 2019/0074801 A1* | 3/2019 | Tan | ........................... | H03F 3/54 |
| 2020/0036330 A1* | 1/2020 | Abdo | ....................... | H01F 6/06 |
| 2020/0052183 A1* | 2/2020 | Shainline | ............. | H03K 3/0315 |

OTHER PUBLICATIONS

Katam, et al., "Logic Optimization, Complex Cell Design, and Retiming of Single Flux Quantum Circuits", In Journal of IEEE Transactions on Applied Superconductivity, vol. 28, Issue 7, Jul. 17, 2018, 9 Pages.
Pasandi, et al., "SFQmap: A Technology Mapping Tool for Single Flux Quantum Logic Circuits", In Proceedings of IEEE International Symposium on Circuits and Systems, May 27, 2018, 5 Pages.
"International Search Report and Written Opinion Issued in PCT Application No. PCT/US22/023218", dated Jul. 29, 2022, 12 Pages.

* cited by examiner

*Primary Examiner* — Mohammed Alam
(74) *Attorney, Agent, or Firm* — Fountainhead Law Group PC

(57) ABSTRACT

A system and method for placing Josephson junction splitters on a superconducting circuit layout receives a specification of locations to be connected by a number of Josephson transmission lines. The system determines, based on the specification, a topology specifying connections between the locations, the topology including a plurality of 1-to-2 Josephson junction splitter nodes. The system determines splitter node locations based at least on ranges determined from distances between adjacent range endpoints of a previous level of the topology, and the system places each of the 1-to-2 Josephson junction splitter nodes at the determined splitter node locations.

18 Claims, 8 Drawing Sheets

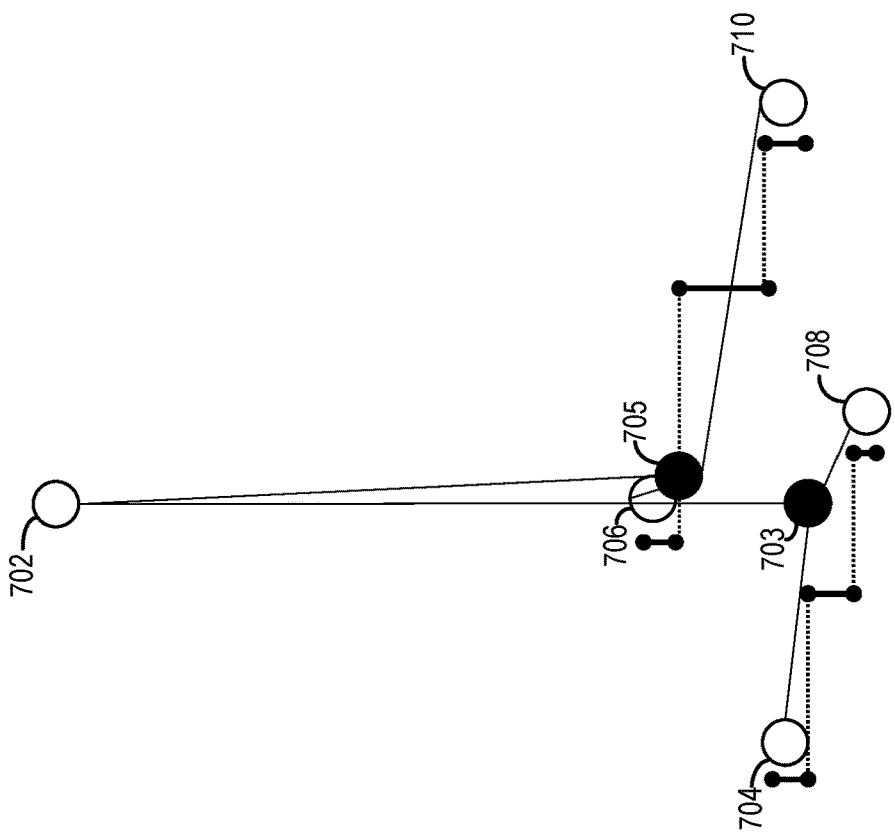
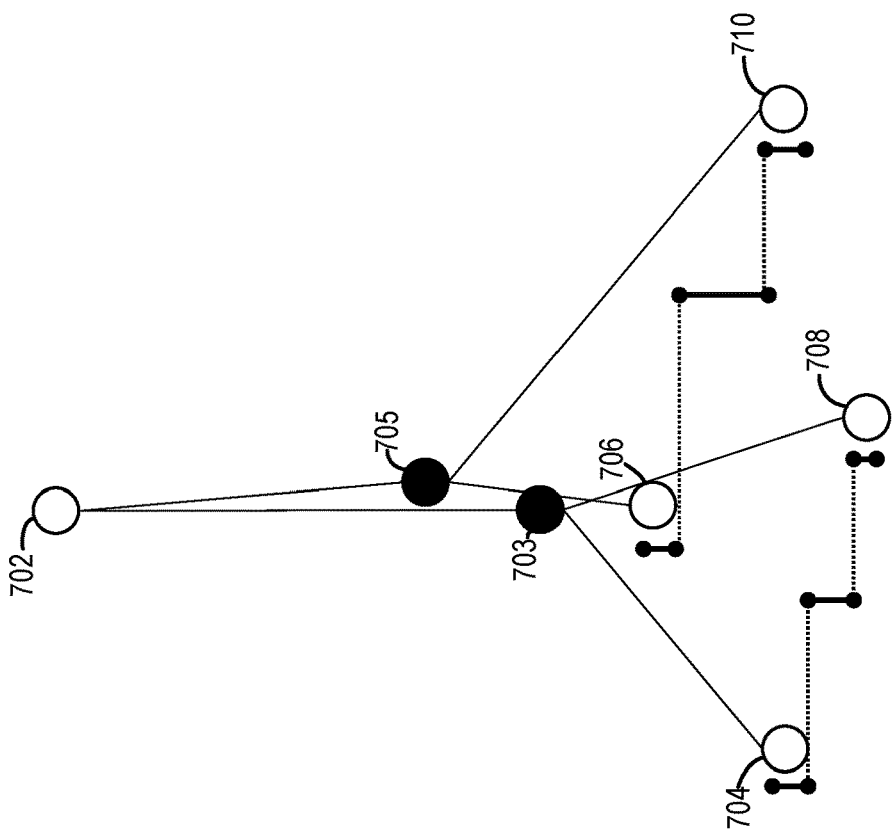

SUPERCONDUCTIVE CIRCUIT SPLITTER PLACEMENT

BACKGROUND

The present disclosure relates to computing, and more particularly, to the automatic placement of superconducting devices.

Superconducting digital logic circuits are made up of active Josephson junctions (JJ) and passive elements such as inductors, resistors, transformers, and transmission lines. Josephson junctions are superconducting devices including two or more superconductors coupled by a weak link. This is a phenomenon of supercurrent known as the Josephson effect. The weak link can consist of a thin insulating barrier, a short section of non-superconducting metal, or a physical constriction that weakens the superconductivity at the point of contact.

The primary advantage of superconducting circuits is improved power efficiency over conventional complementary metal-oxide-semiconductor (CMOS) technology. Much of the power consumed, and heat dissipated, by conventional processors comes from moving information between logic elements rather than the actual logic operations. Since superconductors have a theoretically zero electrical resistance, little energy is required to move bits within the processor.

Electronic design automation (EDA) is a category of software tools for designing electronic systems such as integrated circuits and printed circuit boards. The tools work together so that chip designers can design and layout superconducting circuits, making EDA tools important for their design.

Various embodiments, examples, and advantages of automated superconducting circuit design are described in the detailed description below.

BRIEF DESCRIPTION OF THE DRAWINGS

Various embodiments of the present disclosure are illustrated by way of example and not limitation in the figures of the accompanying drawings.

FIG. 7A illustrates an example of computing an optimal range along a y-axis for internal nodes on a topology according to an embodiment.

FIG. 7B illustrates an example of placing internal nodes within the optimal range along a y-axis on a topology according to an embodiment.

DETAILED DESCRIPTION

Figure 1:
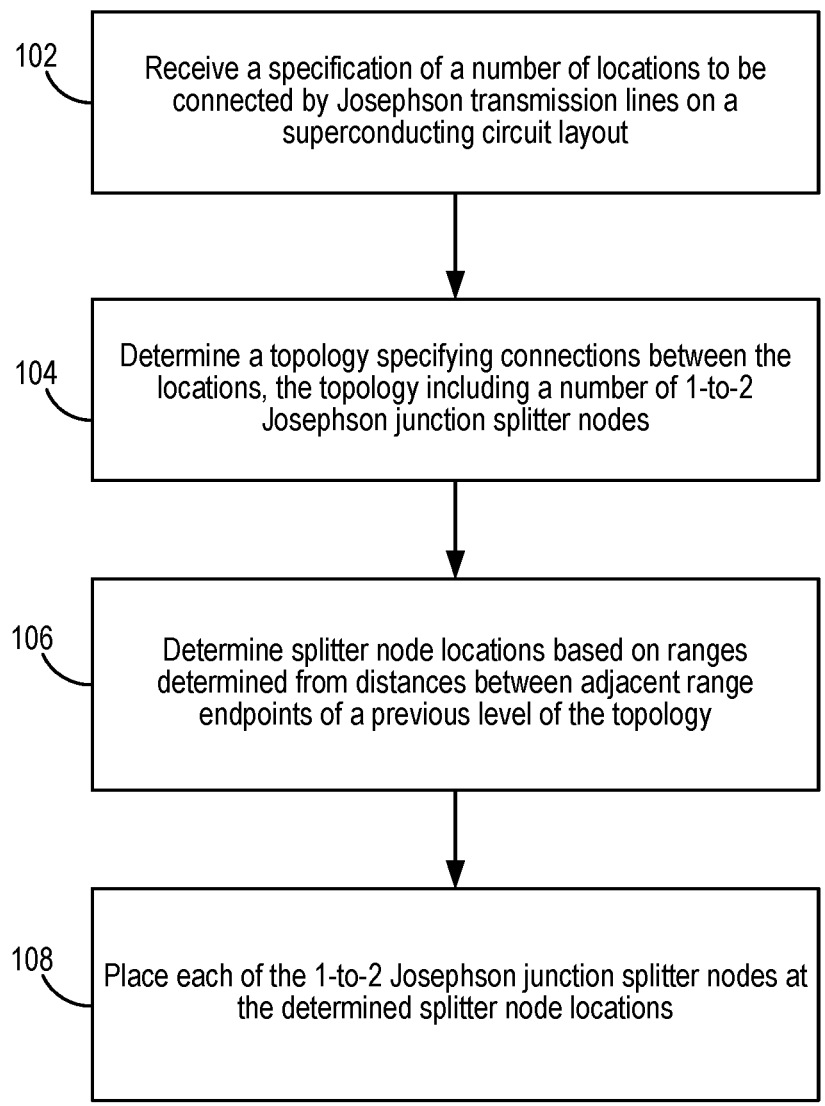
FIG. 1 illustrates a method of Josephson junction splitter placement on a superconducting circuit layout according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

One challenge of timing superconducting circuits is the availability of Josephson Junction (JJ) placement sites. In some cases, additional JJs (e.g., in the form of Josephson Transmission Lines, or JTLs, which are pairs of JJs) must be added to component connections in order to delay a signal, which can lead to JJ site starvation in congested areas of the circuit layout. Furthermore, the distance between JJs is limited by the available inductance of the wire between them. Unlike conventional CMOS designs, which allow wires to go anywhere on a chip and be of any length necessary to meet distance and timing requirements, delaying a signal in a superconducting circuit may require the use of JJs proportional to the delay, which in some cases may be constrained to a limited, discrete grid, for example. In a superconducting circuit design, a single JTL is able to cover a certain amount of distance while introducing a certain amount of delay. Therefore, there may be an ideal number of JTLs for an inductive wiring run with a given signal delay and distance requirement. Furthermore, signal fanout occurs at Josephson junctions designated as splitters. During routing, these splitter JJs are optimally placed in a way that minimizes the total number of JTLs used for the inductive wiring runs on the design.

In conventional CMOS designs, signal splitting is relatively uncomplicated since split points can be placed anywhere on the chip. However, the discrete nature of JJ placement makes signal splitting difficult in the domain of superconducting circuits. Finding a path of JJ sites from the splitter to the neighboring endpoints is non-trivial, and pathfinding algorithms such as A* are computationally infeasible, especially since the pathfinding frequently may involve making sub-optimal moves (e.g., moving away from the target rather than towards it). This may require careful pruning of a search tree, otherwise the search space quickly expands due to the large number of JJ placement sites. Additionally, JJs are typically limited to a fan out of two (e.g., one in and two out, or "1-to-2"). Accordingly mapping a fan out circuit topology to an appropriate configuration of JJs along a wire run can be challenging.

Features and advantages of the present disclosure include designing a superconducting circuit layout with fewer JTLs (and thus fewer JJs) inserted into runs. JJs occupy physical space on the chip, so the fewer of them used, the more space that remains available for logic gates (aka logic) to process data. Thus, minimizing the number of JJs used for wiring runs enables more circuitry to be packed on the chip, creating more powerful and more compact designs. Additionally, features and advantages of the present disclosure may include an algorithm for generating JJ wire runs with a 1-to-2 fanout.

FIG. 1 illustrates a method of Josephson junction splitter placement on a superconducting circuit layout according to an embodiment. In this example, at 102, one or more processors receive a specification of a number of locations to be connected by Josephson transmission lines on a superconducting circuit layout. For example, as illustrated in examples below, a designer can provide the specification in the form of a fan-out tree with the locations including (1) logic or root input pin and (2) a collection of logic and/or root output pins.

At 104, a topology is determined for specifying connections between the locations, the topology including a number of 1-to-2 Josephson junction splitter nodes. For example, as illustrated in examples below, the processors determine the topology using a weighted tree that connects all of the locations and introduces 1-to-2 Josephson junction splitter nodes to reduce the fan-out tree from 1-to-n to a plurality of 1-to-2 splits.

At 106, splitter node locations are determined based on ranges determined from distances between adjacent range endpoints of a previous level of the topology. For example, as illustrated in examples below, a median algorithm may be performed which starts at leaf nodes of the topology and computes optimal ranges for each internal node (e.g., the nodes above the leaf nodes and below the root). Then, starting from the root node and working down through each internal level of the topology, a location for each internal node may be computed based on a comparison of the coordinates of the root/upper-level nodes and the optimal ranges. This process may be executed independently for the x-axis and y-axis of a two-dimensional topology, for example.

At 108, each of the 1-to-2 Josephson junction splitter nodes are placed at the determined splitter node locations. For example, as illustrated in examples below, the coordinates of the internal nodes of the topology represent the determined splitter node locations. As applied to the superconducting circuit layout, the Josephson junction splitters may, for example, be placed at discrete placement sites closest to the coordinates determined from the topology.

Further details and examples of these techniques are provided in more detail below.

Figure 2:
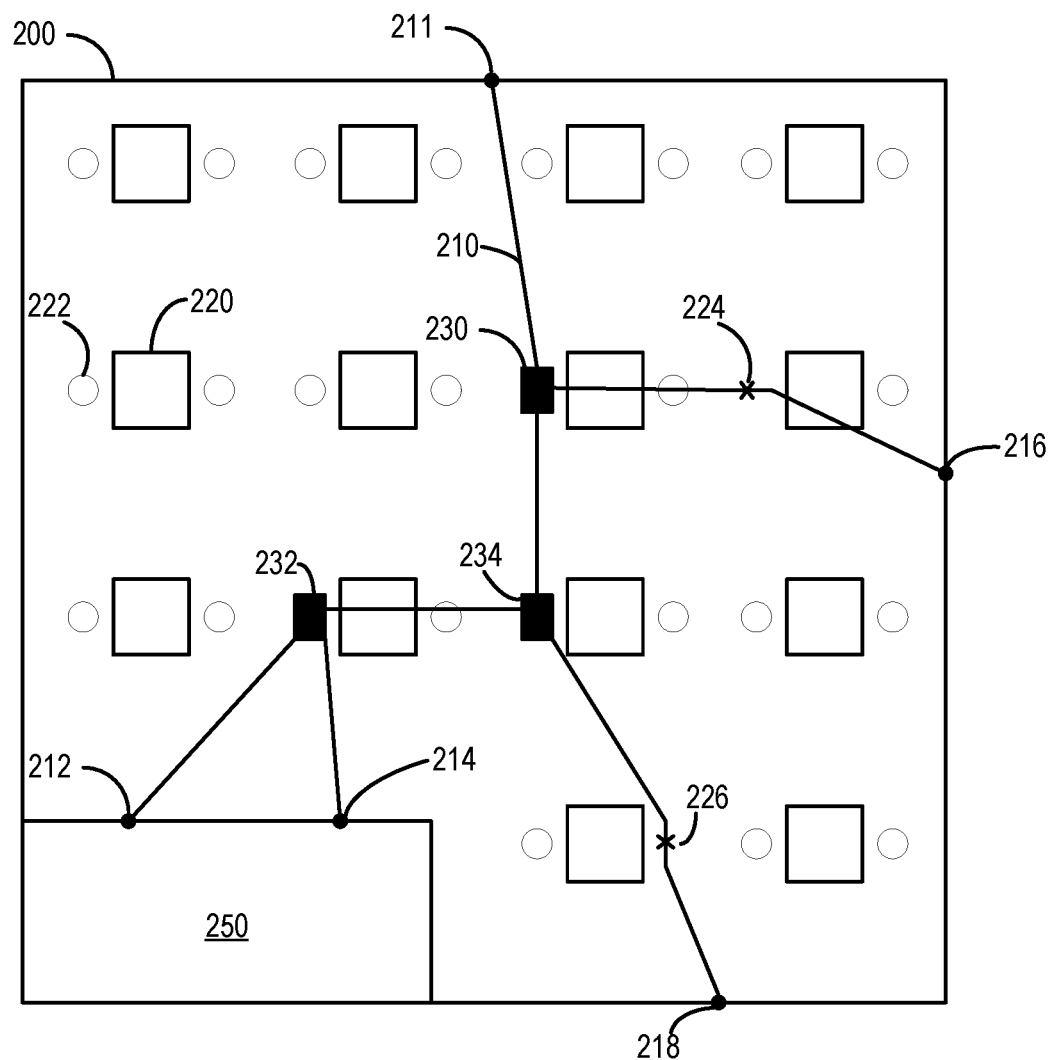
FIG. 2 illustrates a superconducting circuit layout including a number of locations connected with inductive wiring runs and Josephson junction splitters according to an embodiment.

FIG. 2 illustrates a superconducting circuit layout 200 including a number of locations connected with inductive wiring runs 210 and Josephson junction splitters 230, 232, 234 placed at discrete Josephson junction placement sites 222.

On the superconducting circuit layout 200 shown in this example, each of the discrete Josephson junction placement sites 222 are arranged in a two-dimensional array. This array can span the length and width of the superconducting circuit layout 200 with Josephson junction placement sites 222 spaced at regular intervals between them wherever space is not occupied by superconducting logic 250 or other components. In some embodiments, the Josephson junction placement sites 222 are guarded by a moat 220 to avoid flux trapping close to or inside the Josephson junctions. A number of Josephson junction placement sites 222 may be placed around each moat 220, for example, such as the two sites around each as illustrated. As a result, there are a limited number of available Josephson junction placement sites 222, which must be shared among the Josephson junctions 224, 226, which extend the range of an inductive wiring run, and the splitter Josephson junctions 230, 232, 234, which fan out the incoming signal 1-to-2.

In the example illustrated here, a root input pin 211 is connected through a series of inductive wiring runs 210 to a set of four output locations. The output locations include two input locations 212, 214 on the logic 250 and two root output pins 216, 218. In order to fan out the signal from one input to four outputs, 1-to-2 Josephson junction splitters 230, 232, 234 are placed on the superconducting circuit layout 200 at the certain placement sites 222 as shown. Since the signal from the root input pin 211 has to be sent to four output locations, three splitters 230, 232, 234 are used, resulting in separate inductive wiring runs 210 between the splitters and the input and output locations. These wiring runs include a run between the root input pin 211 and the splitter 230, two wiring runs between the splitters 230, 232, 234, and four wiring runs between the splitters 230, 232, 234 and the output locations.

When placing each run, in addition to the splitter junctions 230, 232, 234, a number of Josephson junctions 224, 226 may further be placed at the placement sites 222 in order to meet a distance requirement of the inductive wiring run and inductance target of each wire segment, for example. In some embodiments, the wire inductance cannot be below a minimum threshold value or above a maximum threshold value. Therefore, in order to traverse greater distances, an inductive wiring run requires additional Josephson junctions to be placed on the grid with limited available placement sites 222. For example, since the distance between the splitter 230 and the root output pin 216 is beyond the inductance target of the wire, a Josephson junction 224 is placed between them. Similarly, a Josephson junction 226 is placed between the splitter 234 and the root output pin 218.

Figure 3:
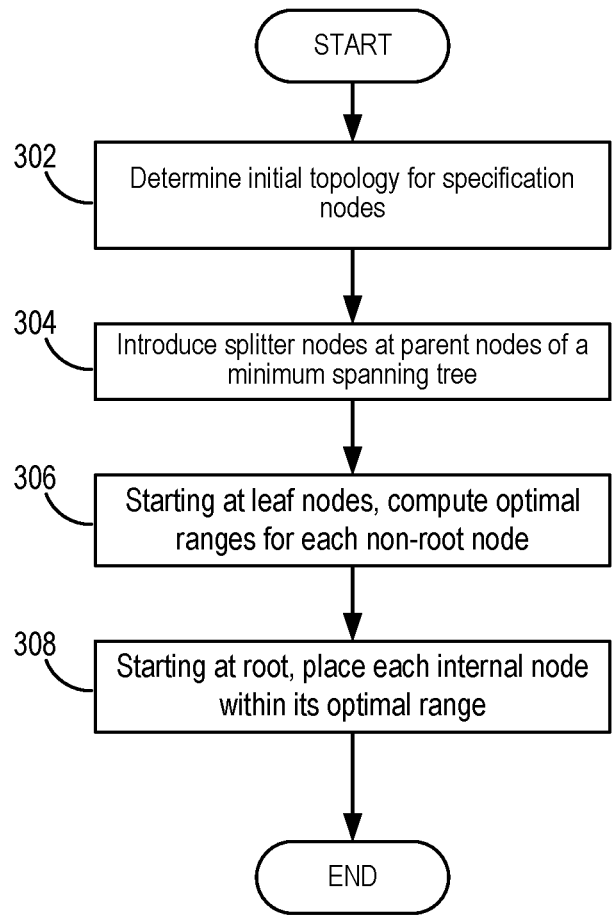
FIG. 3 illustrates a method of determining initial placement of Josephson junction splitters according to an embodiment.

FIG. 3 illustrates a method of determining initial placement of Josephson junction splitters according to an embodiment. Computer processors receive a specification (e.g., a fan-out tree) including a number of locations to be connected by a number of Josephson transmission lines on a superconducting circuit layout. The locations include (1) logic or root input pin and (2) a collection of logic and/or root output pins. The input-outputs may form a 1-to-n fanout, and the algorithm may introduce Josephson junction splitters to reduce the fan-out tree from 1-to-n to a series of 1-to-2 splits. In one embodiment, the processors determine placement locations for the splitters to minimize an overall number of Josephson transmission lines used on the superconducting circuit layout.

In computational geometry, connecting a graph with additional nodes in a way that results in a tree of minimum weight is known as the Steiner tree problem. For graphs, given an undirected graph with non-negative edge weights and a subset of nodes, the Steiner tree problem requires a tree of minimum weight that contains all nodes in the subset (but may include additional nodes in the subset). This problem belongs to the class of NP-hard (nondeterministic polynomial) problems. Although a solution to an NP-hard problem can be verified quickly, there is no known way to find a solution quickly. That is, the time required to solve the problem using currently known algorithms typically increases rapidly as the size of the problem grows (e.g., as more nodes are added). Accordingly, in order to determine an initial topology for the fan-out tree, the processors use an approximation algorithm for the Steiner tree problem.

At 302, the processors determine an initial topology for the nodes included in the received specification. That is, the processors determine how to partition the leaf nodes. For example, in a tree that fans out to three outputs, the nodes may be partitioned in a way that the first and second outputs share a splitter or in a way that the second and third outputs share a splitter. In order to determine the topology, the processors may calculate a minimum spanning tree for the nodes. A minimum spanning tree is a provably good approximation of a solution to the Steiner tree problem, albeit without adding any new nodes to the tree. A minimum spanning tree is a subset of the edges of a connected, edge-weighted undirected graph that connects the nodes together, without any cycles and with the minimum possible total edge weight. That is, it is a spanning tree whose sum of edge weights is as small as possible.

At 304, the processors introduce splitter nodes adjacent to the parent nodes of the minimum spanning tree. Since the minimum spanning tree does not add any new nodes itself, the splitter nodes are added to represent the Josephson junction splitters on the topology. The splitter nodes are introduced topologically adjacent to the parent nodes such that the new splitter connects directly to the parent, which then becomes a leaf An example illustrating this technique is described further below.

Once the topology has been determined, the processors determine initial placement coordinates for each of the splitter nodes. In some embodiments, the processors execute a median algorithm which provides a provably good approximation to a rectilinear Steiner tree, which is a variant of the Steiner tree problem in which the Euclidean distance is replaced with the distance of a network consisting only of vertical and horizontal line segments, for example.

At 306, the processors, starting at the leaf nodes and traversing bottom-up, compute optimal coordinate ranges for each non-root node. In one embodiment, the processors compute optimal coordinate ranges over an x-axis and a y-axis independently. That is, the processors find an optimal range for the x-coordinate for each of the internal nodes independently from finding the optimal range for the y-coordinate for each of the internal nodes.

For computing the optimal ranges, each leaf may start off with a zero-size range equal to its own given coordinate on the topology. Then, for each internal node starting from the bottom level of the topology, the median algorithm takes the four range endpoints of its children. The four range endpoints are sorted in numeric order, and the middle two values are used as the node's optimal range.

At 308, the processors, starting at the root node and traversing top-down, compute a coordinate for each internal node within that node's optimal range. In some examples, if the coordinate of the parent node for a particular internal node is within the node's optimal range, the internal node uses the same coordinate as its parent node. Otherwise, if the coordinate of the parent node is outside the internal node's optimal range, the coordinate of the parent node is clipped to the edge of the optimal range nearest the coordinate of the parent node. For example, if the optimal x-coordinate range of an internal node is 5-10 and its parent node has an x-coordinate of 3, the x-coordinate of the internal node is set to 5.

Figure 4:
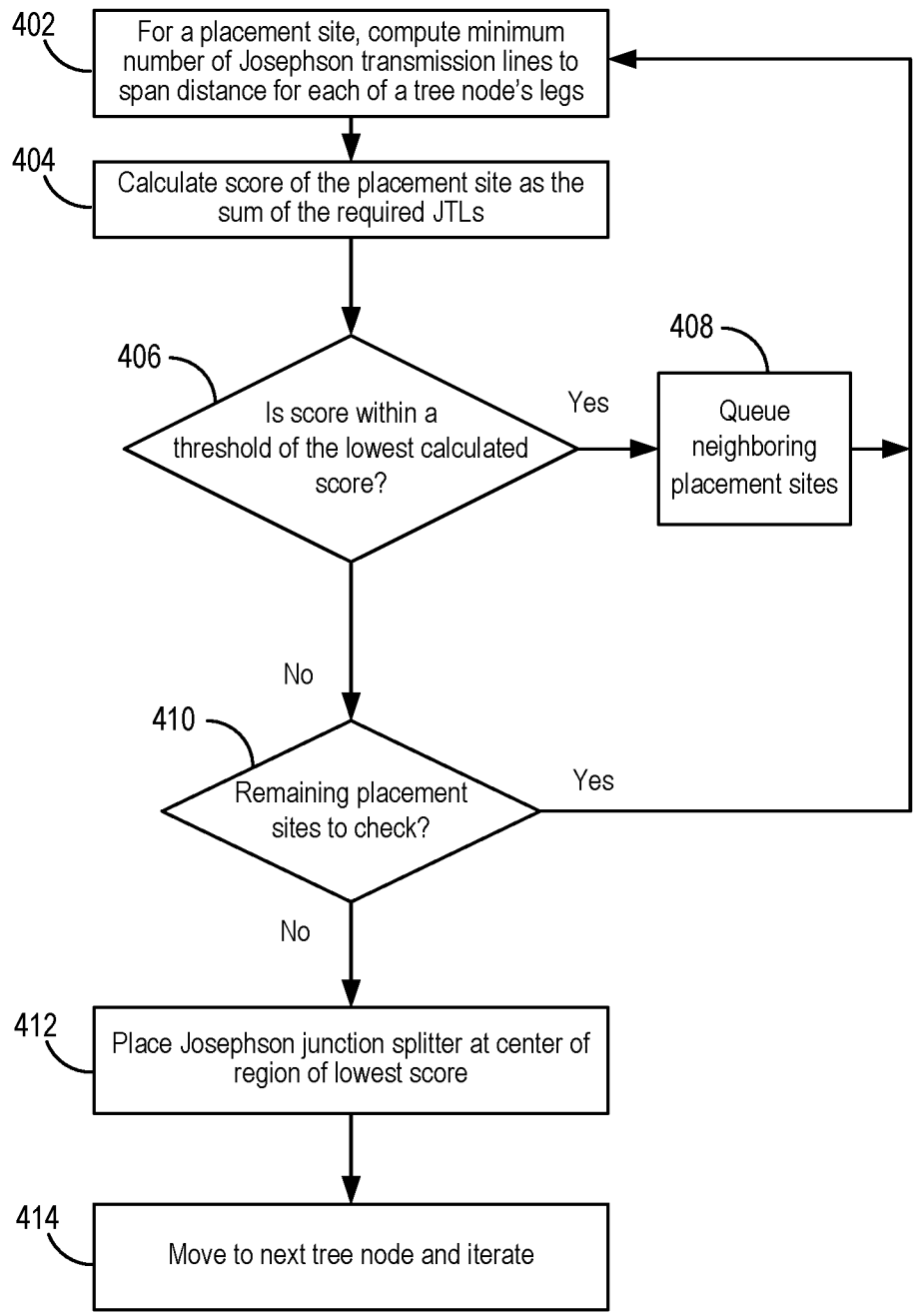
FIG. 4 illustrates a method of refining the placement of Josephson junction splitters according to an embodiment.

FIG. 4 illustrates a method of refining the placement of Josephson junction splitters according to an embodiment. Once initial placement for the nodes has been established, such as through the median algorithm described above, a refinement process can be run to iterate over each tree node in order to minimize the number of Josephson transmission lines required for the superconducting circuit layout.

At 402, for a particular tree node, and starting at a placement site corresponding to the initial placement coordinates for the particular tree node, a minimum number of Josephson transmission lines to span the distance for each of the tree node's three legs may be computed (e.g., the input leg and two output legs of a 1-to-2 splitter).

In some embodiments, computing the minimum number of JTLs is performed with a run length checking process that uses a greedy algorithm. In general, the greedy algorithm follows a problem-solving heuristic of making the locally optimal choice at each step. For example, at each step, the greedy algorithm selects the Josephson junction placement site which is closest to the end point and reachable from the previous placement site based on the inductance constraints of the wire. This may not produce an optimal solution, but nonetheless, a greedy heuristic may yield locally optimal solutions that approximate a globally optimal solution in a reasonable amount of time. In other examples, the greedy algorithm can choose the next N closest sites (where N is a user-configurable value). From there, the run length checker chooses the next closest N sites that are closest to the target which are also reachable from one of the previous N sites. This process is repeated until the target is reached, and the total number of JTLs required is saved.

At 404, the processors calculate a score for the placement site. In some examples, the score is calculated as the sum of the required JTLs for each of the tree node's three legs. For example, if one leg requires 6 JTLs and the other legs require 2 each, the score for the placement site is 10. If this score is lower than the score of any other placement site for the current tree node, the score and the placement site are saved as the lowest score.

At 406, the processors determine whether the calculated score is within a threshold of the lowest calculated score for the particular tree node. If the calculated score is within the threshold, the processors queue neighboring placement sites at 408 and repeat steps 402-408 for one of the neighboring placement sites.

For example, if the calculated score is 10 JTLs, the lowest score is 9 JTLs, and the threshold value is at least 1, the processors determine that the calculated score is within the threshold. In some embodiments, a threshold value of 1 JTL is used. By using a score threshold, the refinement process can avoid having to score every possible placement site on the design while also reducing the chance of choosing a local minimum (and missing a placement site elsewhere on the design that would result in fewer JTLs used).

At 410, the process will repeat steps 402-408 until the processors determine that there are no remaining placement sites to check for the particular node.

At 412, the processors designate the center of the region of lowest score as a site to place a Josephson junction splitter on the superconducting circuit design. For example, if a single placement site has the lowest score, that placement site is used. However, if multiple placement sites are tied for the lowest score, then a site at or near the center of the lowest-scored sites is used.

At 414, the processors determine whether there are additional tree nodes in the topology to check and whether the refinement process has executed a preprogrammed number of refinement iterations. In some embodiments, the refinement process is executed for each of the internal tree nodes in the topology representing Josephson junction splitters. Once the refinement process has been executed for each node, it can be repeated over the internal tree nodes for a programmed number of times (e.g., 4 or 5 times).

Example Implementations

Figure 5C:
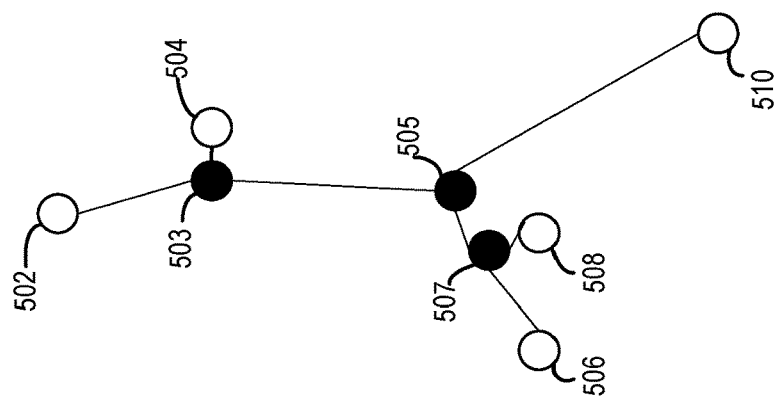
FIG. 5C illustrates an example of using the minimum spanning tree to determine the initial placement of Josephson junction splitters according to an embodiment.
Figure 5B:
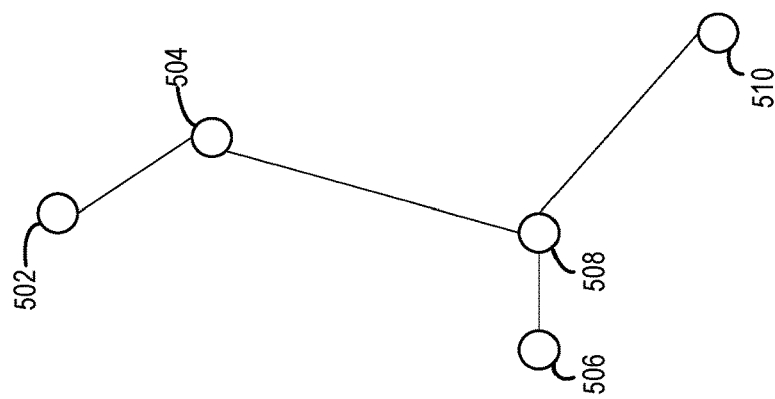
FIG. 5B illustrates an example of computing a minimum spanning tree for the topology of locations according to an embodiment.
Figure 5A:
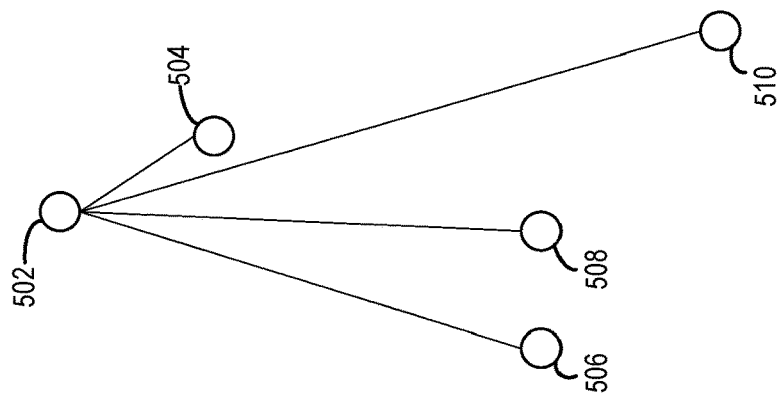
FIG. 5A illustrates an example topology corresponding to a specification of locations to be connected by Josephson transmission lines on a superconducting circuit layout according to an embodiment.

FIG. 5A illustrates an example topology corresponding to a specification of locations to be connected by Josephson transmission lines on a superconducting circuit layout according to an embodiment. As shown, the fan-out tree includes a root node 502 and four leaf nodes 504, 506, 508, and 510.

FIG. 5B illustrates an example of computing a minimum spanning tree for the topology of locations according to an embodiment. As illustrated, the computed minimum spanning tree connects each of the nodes 502-510 with the shortest sum of line lengths possible for this arrangement of nodes without adding any new nodes to the tree. Accordingly, wire run lengths are minimized by converting the initial 1-to-n fan-out tree with a minimum spanning tree.

FIG. 5C illustrates an example of using the minimum spanning tree (MST) to determine the initial placement of Josephson junction splitters according to an embodiment. For every one of the internal nodes of the MST tree that has an outbound edge to another node in the MST (e.g., nodes in the MST that are not leaf nodes such as nodes 504 and 508), one or more splitter nodes are added to the tree directly connected to the node. In this example, node 504 in the MSP in FIG. 5B has one output edge. Accordingly, a splitter 503 is used to form the connection between node 502 and node 504, with a second leg of the splitter connecting the remaining nodes. Node 508 has two output edges. Accordingly, two splitters 505 and 507 are used to form connections to nodes 506, 508, and 510. Thus, splitters 503, 505, and 507 are inserted so that internal nodes 504 and 508 of the MST are converted back to leaf nodes, for example. The result is the topology to be used for the root, splitter, and outputs. The next step is placement of the resulting nodes.

Figure 6B:
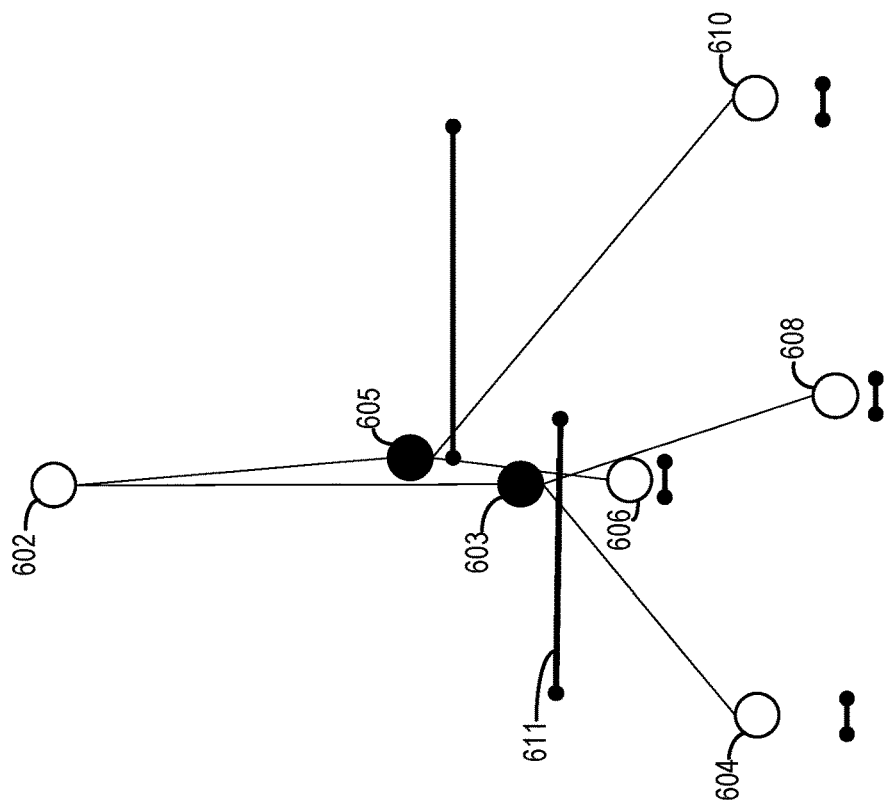
FIG. 6B illustrates an example of placing internal nodes within the optimal range along an x-axis on a topology according to an embodiment.
Figure 6A:
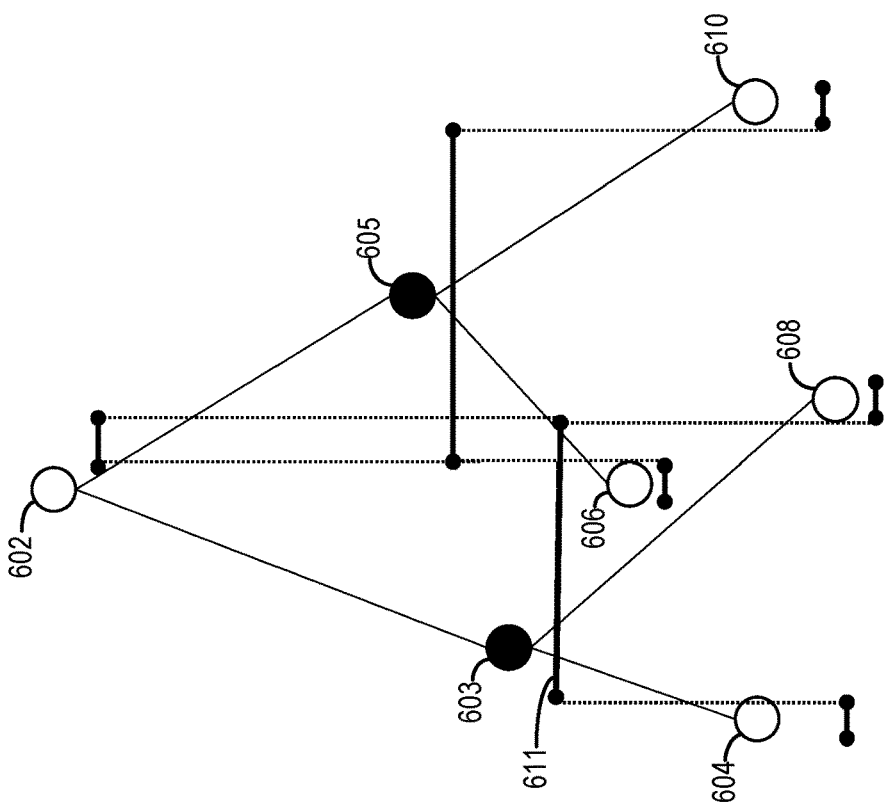
FIG. 6A illustrates an example of computing an optimal range along an x-axis for internal nodes on a topology according to an embodiment.

Initially, the root node and leaf nodes of the topology (the input and outputs) have known coordinates. Thus, the algorithm determines placement of the splitters. FIGS. 6A-B illustrates an example of determining the x-axis coordinates. First, FIG. 6A illustrates computing an optimal range along an x-axis for internal nodes on a topology from the bottom up. In this example, the topology is a tree with three levels: a root node 602 at the top, a pair of internal nodes 603, 605 on the second level, and four leaf nodes 604, 606, 608, 610 on the lowest level. Starting at the leaf nodes and traversing bottom-up, optimal x-coordinate ranges are calculated for each non-root node. Each of the four leaf nodes 604, 606, 608, 610 starts off with a zero-size range equal to its own given coordinate on the topology. Then, for each internal node starting from the bottom level of the topology, the algorithm determines the four range endpoints of its children. The four range endpoints are sorted in numeric order, and the middle two values are used as the node's optimal range. Since leaf nodes use the coordinates, leaf nodes only result in two values for each parent node.

For example, internal node 603 has two children: leaf nodes 604 and 608. If leaf node 604 has an x-coordinate range of 2-2 (e.g., 2, where leaf nodes use their coordinates as the range) and leaf node 608 has an x-coordinate range of 8-8 (e.g., 8), the optimal range along the x-axis of internal node 603 is 2-8. Internal node 605 has two children: leaf nodes 606 and 610. If leaf node 606 has an x-coordinate range of 6-6 (e.g., 6) and leaf node 610 has an x-coordinate range of 12-12 (e.g., 12), the optimal range 611 along the x-axis of internal node 603 is 6-12. Although not illustrated in this simplified example, if 602 were an internal node rather than the root, its children would be 603 and 605, and the four range endpoints would be 2, 6, 8, and 12. Accordingly, the node would have an optimal range of the two middle values, or 6-8. The ranges determined during the bottom up step may be used to adjust the positions of the splitters on the top down step as will now be described.

FIG. 6B illustrates an example of placing internal nodes within the optimal range along an x-axis on the topology according to an embodiment. Starting at the root node 602 and traversing top-down, a coordinate for each internal node is determined within that node's optimal range. In some examples, if the coordinate of the parent node for a particular internal node is (e.g., projecting downward from node 602 here) within the node's optimal range, then the internal node uses the same coordinate as its parent node. Otherwise, if the coordinate of the parent node (e.g., when projected downward) is outside the internal node's optimal range, the coordinate of the internal node is moved to the edge of (aka clipped to) the optimal range nearest the coordinate of the parent node.

In the example illustrated in FIG. 6B, the optimal x-coordinate ranges determined from the bottom-up process are 2-8 for internal node 603 and 6-12 for internal node 605. If the x-coordinate of the root node 602 (which is the parent node of both internal nodes 603, 605) is 5, then the x-coordinate for internal node 603 is set to 5 (projecting the x-coordinate of the root node down in the topology) since it is within the optimal range of 2-8. For internal node 605, however, 5 is outside its optimal range of 6-12. Therefore, the x-coordinate of internal node 605 is set to 6, which is 5 moved to (aka clipped to) the nearest edge of the optimal range. FIG. 6B thus illustrates the result x-axis positions of the splitter nodes in the topology.

FIG. 7A illustrates an example of computing an optimal range along a y-axis for internal nodes on a topology according to an embodiment. The y-axis positions may be determined using the same technique applied to the y-axis, for example.

Continuing the example from FIG. 6A-B, starting at the leaf nodes and traversing bottom-up, optimal y-coordinate ranges are calculated for each non-root node. Each of the four leaf nodes 704, 706, 708, 710 starts off with a zero-size range equal to its own given y-coordinate on the topology. Then, for each internal node starting from the bottom level of the topology, the median algorithm takes the four range endpoints of its children. The four range endpoints are sorted in numeric order, and the middle two values are used as the node's optimal range.

For example, internal node 703 has two children: leaf nodes 704 and 708. If leaf node 704 has a y-coordinate range of 4-4 and leaf node 708 has a y-coordinate range of 2-2, the optimal range along the y-axis of internal node 703 is 2-4. Internal node 705 has two children: leaf nodes 706 and 710. If leaf node 706 has a y-coordinate range of 7-7 and leaf node 710 has a y-coordinate range of 4-4, the optimal range along the y-axis of internal node 703 is 4-7.

FIG. 7B illustrates an example of placing internal nodes within the optimal range along a y-axis on a topology according to an embodiment. In the example illustrated here, the optimal y-coordinate ranges determined from the bottom-up process are 2-4 for internal node 703 and 4-7 for internal node 705. If the y-coordinate of the root node 702 (which is the parent node of both internal nodes 703, 705) is 12, then the y-coordinates for internal node 703 and internal node 705 are set to 4 and 7, respectively, because 12 is outside the optimal ranges of both nodes. As a result, the 12 is moved to the nearest edge of each optimal range, resulting in y-coordinates of 4 and 7 for the internal nodes illustrated. FIG. 7B illustrates the final coordinates of the splitter nodes 703 and 705.

In some cases, a splitter node may have one leaf and one other splitter node as children (e.g., splitter node 505 in FIG. 5). Referring again to FIG. 5, in this case the first the range for node 507 would be computed. For example, if node 506 and node 508 have coordinates 1 and 2, then when computing the range for 507 then four endpoints are 1, 1, 2, 2, so the range is 1-2. Then the range for node 505 can be computed. If node 510 has a coordinate of 4, then when computing the range for node 505 the four endpoints are 1, 2, 4, 4, so the range is 2-4, for example. Accordingly, a splitter has two children, but the children don't have to be leaves. If the children are not leaves, then those children's ranges may be computed first from the bottom-up.

While the above examples illustrate placement of splitters for internal nodes of a 3 layer topology, the techniques described herein can be used for topologies with many more layers and many more nodes as would be evident to one skilled in the art based on the present disclosure. Accordingly, the above examples are merely illustrative.

Example Computer System

Figure 8:
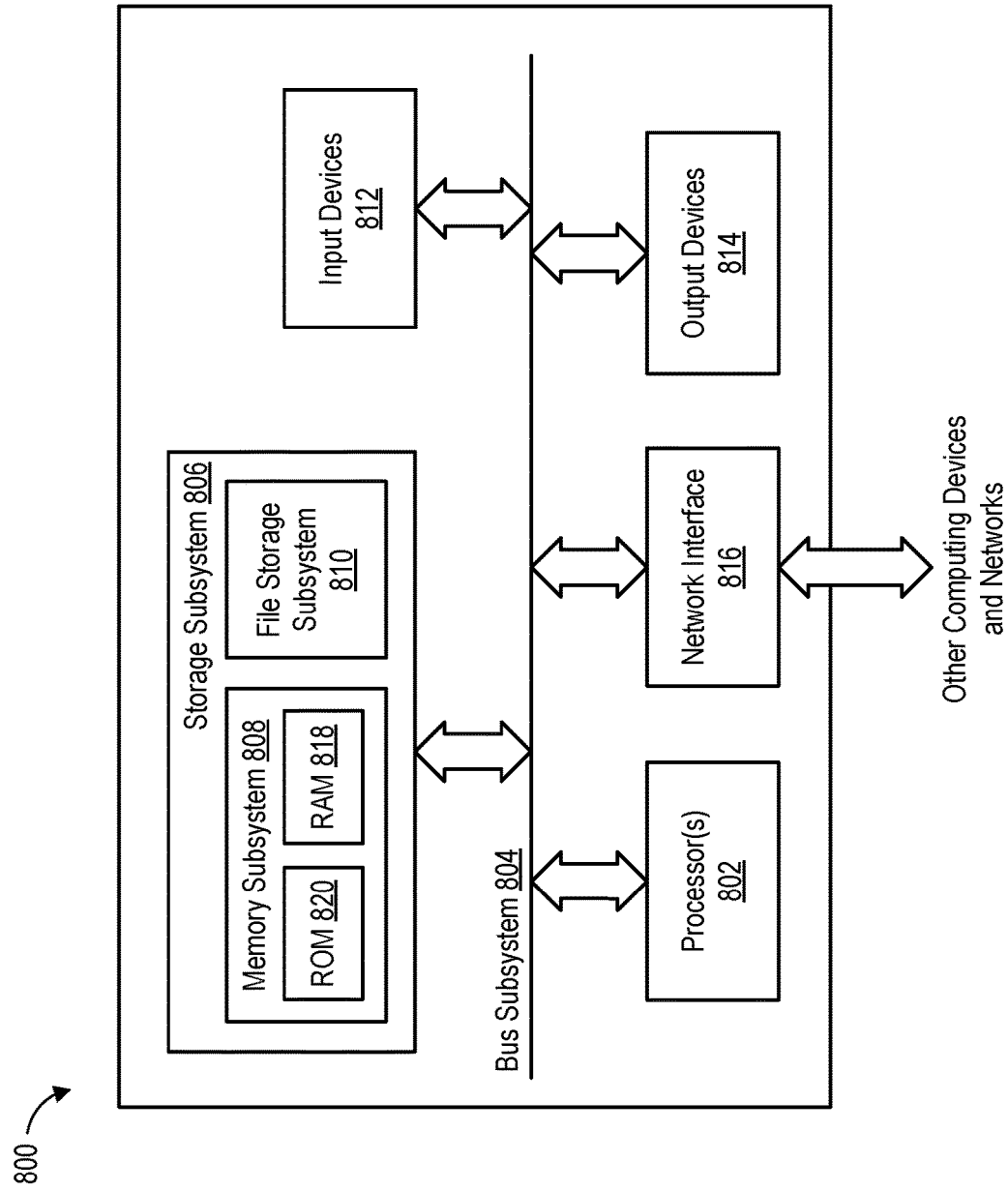
FIG. 8 illustrates a simplified block diagram of an example computer system according to an embodiment.

FIG. 8 illustrates a simplified block diagram of an example computer system 800, which can be used to implement the techniques described in the foregoing disclosure. As shown, computer system 800 includes one or more processors 802 that communicate with a number of peripheral devices via a bus subsystem 804. These peripheral devices may include a storage subsystem 806 (e.g., comprising a memory subsystem 808 and a file storage subsystem 810) and a network interface subsystem 816. Some computer systems may further include user interface input devices 812 and/or user interface output devices 814.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple busses.

Network interface subsystem 816 can serve as an interface for communicating data between computer system 800 and other computer systems or networks. Embodiments of network interface subsystem 816 can include, e.g., Ethernet, a Wi-Fi and/or cellular adapter, a modem (telephone, satellite, cable, ISDN, etc.), digital subscriber line (DSL) units, and/or the like.

Storage subsystem 806 includes a memory subsystem 808 and a file/disk storage subsystem 810. Subsystems 808 and 810 as well as other memories described herein are examples of non-transitory computer-readable storage media that can store executable program code and/or data that provide the functionality of embodiments of the present disclosure.

Memory subsystem 808 includes a number of memories including a main random-access memory (RAM) 818 for storage of instructions and data during program execution and a read-only memory (ROM) 820 in which fixed instructions are stored. File storage subsystem 810 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than computer system 800 are possible.

FURTHER EXAMPLE EMBODIMENTS

In various embodiments, the present disclosure includes systems, methods, and apparatuses for the automatic placement of superconducting devices. The following examples may be used alone or in various combinations.

In one embodiment, the present disclosure includes a system comprising: one or more processors; and a non-transitory computer readable storage medium having stored thereon program code executable by the one or more processors, the program code causing the one or more processors to: receive a specification of a plurality of locations to be connected by a number of Josephson transmission lines on a superconducting circuit layout; determine, based on the specification, a topology specifying connections between the plurality of locations, the topology including a plurality of 1-to-2 Josephson junction splitter nodes; determine splitter node locations on the superconducting circuit layout based at least on a plurality of ranges determined from distances between adjacent range endpoints of a previous level of the topology; and place each of the plurality of 1-to-2 Josephson junction splitter nodes at the determined splitter node locations.

In another embodiment, the present disclosure includes a method of placing Josephson junction splitters on a superconducting circuit layout, the method comprising: receiving a specification of a plurality of locations to be connected by a number of Josephson transmission lines on a superconducting circuit layout; determining, based on the specification, a topology specifying connections between the plurality of locations, the topology including a plurality of 1-to-2 Josephson junction splitter nodes; determining splitter node locations on the superconducting circuit layout based at least on a plurality of ranges determined from distances between adjacent range endpoints of a previous level of the topology; and placing each of the plurality of 1-to-2 Josephson junction splitter nodes at the determined splitter node locations.

In another embodiment, the present disclosure includes a non-transitory computer readable storage medium having stored thereon program code executable by one or more processors, the program code causing the one or more processors to: receive a specification of a plurality of locations to be connected by a number of Josephson transmission lines on a superconducting circuit layout; determine, based on the specification, a topology specifying connections between the plurality of locations, the topology including a plurality of 1-to-2 Josephson junction splitter nodes; determine splitter node locations on the superconducting circuit layout based at least on a plurality of ranges determined from distances between adjacent range endpoints of a previous level of the topology; and place each of the plurality of 1-to-2 Josephson junction splitter nodes at the determined splitter node locations.

In one embodiment, the plurality of ranges are determined from the distances between the adjacent range endpoints by: for each of the plurality of internal nodes starting from the lowest level of a plurality of levels of the topology, determining four range endpoints of children of a particular internal node, sorting the range endpoints, and using a middle two range endpoints as the range for the particular internal node.

In one embodiment, the topology includes a root node, a plurality of leaf nodes, and a plurality of internal nodes, between the root node and the plurality of leaf nodes, spanning one or more levels of the topology.

In one embodiment, the root node and the plurality of leaf nodes represent the plurality of locations to be connected.

In one embodiment, the plurality of ranges are determined independently for an x-axis and a y-axis.

In one embodiment, the splitter node locations are further determined based on a coordinate location of a parent node of each of a plurality of internal nodes of the topology.

In one embodiment, the splitter node locations are further determined based on a set of inductance constraints for the Josephson transmission lines to minimize the number of Josephson transmission lines used on the superconducting circuit layout.

In one embodiment, the program code further causes the one or more processors to refine placement of at least some of the plurality of 1-to-2 Josephson junction splitter nodes by: for a particular splitter node location, calculating a sum of the minimum number of Josephson transmission lines, based on the set of inductance constraints, to span distances on the topology for each leg of the given splitter node location; comparing the sum for the particular splitter node location to sums calculated for neighboring splitter node locations; and placing the 1-to-2 Josephson junction splitter node at a site with a least calculated sum.

In one embodiment, each of the plurality of 1-to-2 Josephson junction splitter nodes are placed at one of a plurality of discrete Josephson junction placement sites on the superconducting circuit layout.

The above description illustrates various embodiments of the present disclosure along with examples of how aspects of the particular embodiments may be implemented. The above examples should not be deemed to be the only embodiments and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A system comprising:
   one or more processors; and
   a non-transitory computer readable storage medium having stored thereon program code executable by the one or more control processors, the program code causing the one or more processors to:
   receive a specification of a plurality of locations to be connected by a number of Josephson transmission lines on a superconducting circuit layout;
   determine, based on the specification, a topology specifying connections between the plurality of locations, the topology including a plurality of 1-to-2 Josephson junction splitter nodes, wherein the topology includes a root node, a plurality of leaf nodes, and a plurality of internal nodes, between the root node and the plurality of leaf nodes, spanning one or more levels of the topology;
   determine splitter node locations on the superconducting circuit layout based at least on a plurality of ranges determined from distances between adjacent range endpoints of a previous level of the topology; and
   place each of the plurality of 1-to-2 Josephson junction splitter nodes at the determined splitter node locations.

2. The system of claim 1, wherein the plurality of ranges are determined from the distances between the adjacent range endpoints by:
   for each of the plurality of internal nodes starting from the lowest level of a plurality of levels of the topology, determining four range endpoints of children of a particular internal node, sorting the range endpoints, and using a middle two range endpoints as the range for the particular internal node.

3. The system of claim 1, wherein the root node and the plurality of leaf nodes represent the plurality of locations to be connected.

4. The system of claim 1, wherein the plurality of ranges are determined independently for an x-axis and a y-axis.

5. The system of claim 1, wherein the splitter node locations are further determined based on a coordinate location of a parent node of each of a plurality of internal nodes of the topology.

6. The system of claim 1, wherein the splitter node locations are further determined based on a set of inductance constraints for the Josephson transmission lines to minimize the number of Josephson transmission lines used on the superconducting circuit layout.

7. The system of claim 6, wherein the program code further causes the one or more processors to refine placement of at least some of the plurality of 1-to-2 Josephson junction splitter nodes by:
   for a particular splitter node location, calculating a sum of the minimum number of Josephson transmission lines, based on the set of inductance constraints, to span distances on the topology for each leg of the given splitter node location;
   comparing the sum for the particular splitter node location to sums calculated for neighboring splitter node locations; and
   placing the 1-to-2 Josephson junction splitter node at a site with a least calculated sum.

8. The system of claim 1, wherein each of the plurality of 1-to-2 Josephson junction splitter nodes are placed at one of a plurality of discrete Josephson junction placement sites on the superconducting circuit layout.

9. A method of placing Josephson junction splitters on a superconducting circuit layout, the method comprising:
   receiving a specification of a plurality of locations to be connected by a number of Josephson transmission lines on a superconducting circuit layout;
   determining, based on the specification, a topology specifying connections between the plurality of locations, the topology including a plurality of 1-to-2 Josephson junction splitter nodes, wherein the topology includes a root node, a plurality of leaf nodes, and a plurality of internal nodes, between the root node and the plurality of leaf nodes, spanning one or more levels of the topology;
   determining splitter node locations on the superconducting circuit layout based at least on a plurality of ranges determined from distances between adjacent range endpoints of a previous level of the topology; and
   placing each of the plurality of 1-to-2 Josephson junction splitter nodes at the determined splitter node locations.

10. The method of claim 9, wherein the plurality of ranges are determined from the distances between the adjacent range endpoints by:
    for each of the plurality of internal nodes starting from the lowest level of a plurality of levels of the topology, determining four range endpoints of children of a particular internal node, sorting the range endpoints, and using a middle two range endpoints as the range for the particular internal node.

11. The method of claim 9, wherein the root node and the plurality of leaf nodes represent the plurality of locations to be connected.

12. The method of claim 9, wherein the plurality of ranges are determined independently for an x-axis and a y-axis.

13. The method of claim 9, wherein the splitter node locations are further determined based on a coordinate location of a parent node of each of a plurality of internal nodes of the topology.

14. The method of claim 9, wherein the splitter node locations are further determined based on a set of inductance constraints for the Josephson transmission lines to minimize the number of Josephson transmission lines used on the superconducting circuit layout.

15. The method of claim 14, further comprising refining placement of at least some of the plurality of 1-to-2 Josephson junction splitter nodes by:
  for a particular splitter node location, calculating a sum of the minimum number of Josephson transmission lines, based on the set of inductance constraints, to span distances on the topology for each leg of the given splitter node location;
  comparing the sum for the particular splitter node location to sums calculated for neighboring splitter node locations; and
  placing the 1-to-2 Josephson junction splitter node at a site with a least calculated sum.

16. The method of claim 9, wherein each of the plurality of 1-to-2 Josephson junction splitter nodes are placed at one of a plurality of discrete Josephson junction placement sites on the superconducting circuit layout.

17. A non-transitory computer readable storage medium having stored thereon program code executable by one or more processors, the program code causing the one or more processors to:
  receive a specification of a plurality of locations to be connected by a number of Josephson transmission lines on a superconducting circuit layout;
  determine, based on the specification, a topology specifying connections between the plurality of locations, the topology including a plurality of 1-to-2 Josephson junction splitter nodes, wherein the topology includes a root node, a plurality of leaf nodes, and a plurality of internal nodes, between the root node and the plurality of leaf nodes, spanning one or more levels of the topology;
  determine splitter node locations on the superconducting circuit layout based at least on a plurality of ranges determined from distances between adjacent range endpoints of a previous level of the topology; and
  place each of the plurality of 1-to-2 Josephson junction splitter nodes at the determined splitter node locations.

18. The non-transitory computer readable storage medium of claim 17, wherein the plurality of ranges are determined from the distances between the adjacent range endpoints by:
  for each of the plurality of internal nodes starting from the lowest level of a plurality of levels of the topology, determining four range endpoints of children of a particular internal node, sorting the range endpoints, and using a middle two range endpoints as the range for the particular internal node.

* * * * *